United States Patent [19]

van der Schoot et al.

[11] Patent Number: 4,793,015
[45] Date of Patent: Dec. 27, 1988

[54] APPARATUS FOR CLEANING EGGS AND LIKE ARTICLES

[75] Inventors: Jelle van der Schoot; Gerrit J. H. Nijkamp, both of Aalten, Netherlands

[73] Assignee: Staalkat B.V., Netherlands

[21] Appl. No.: 94,303

[22] Filed: Sep. 8, 1987

[51] Int. Cl.$^4$ ............................................. A01K 43/00
[52] U.S. Cl. ...................... 15/3.13; 15/3.17; 15/77
[58] Field of Search .................. 15/3.1, 3.13, 3.14, 15/3.14, 3.16, 3.17, 77, 102; 134/6

[56] References Cited

U.S. PATENT DOCUMENTS 3,392,414  7/1968  Cathcart .............................. 15/3.13
4,499,623  2/1985  Kuhl ..................................... 15/3.13

Primary Examiner—Edward L. Roberts
Attorney, Agent, or Firm—Griffin, Branigan & Butler

[57] ABSTRACT

An apparatus for cleaning eggs comprising a housing, a roller conveyor, at least the upper run of which extends through said housing, rotary brushes disposed above said upper run of the roller conveyor, at least one driving crank shaft for moving the brushes in an axial direction, and fluid supply means disposed above the brushes. The improvement is that the brushes are coupled two by two by means of a yoke having a bearing arranged to rotate about a journal which is fixedly secured to a frame. Each yoke is further provided with a pin which is connected to a driving rod, and one end of the driving rod is driven by a driving crank-shaft mechanism.

10 Claims, 2 Drawing Sheets

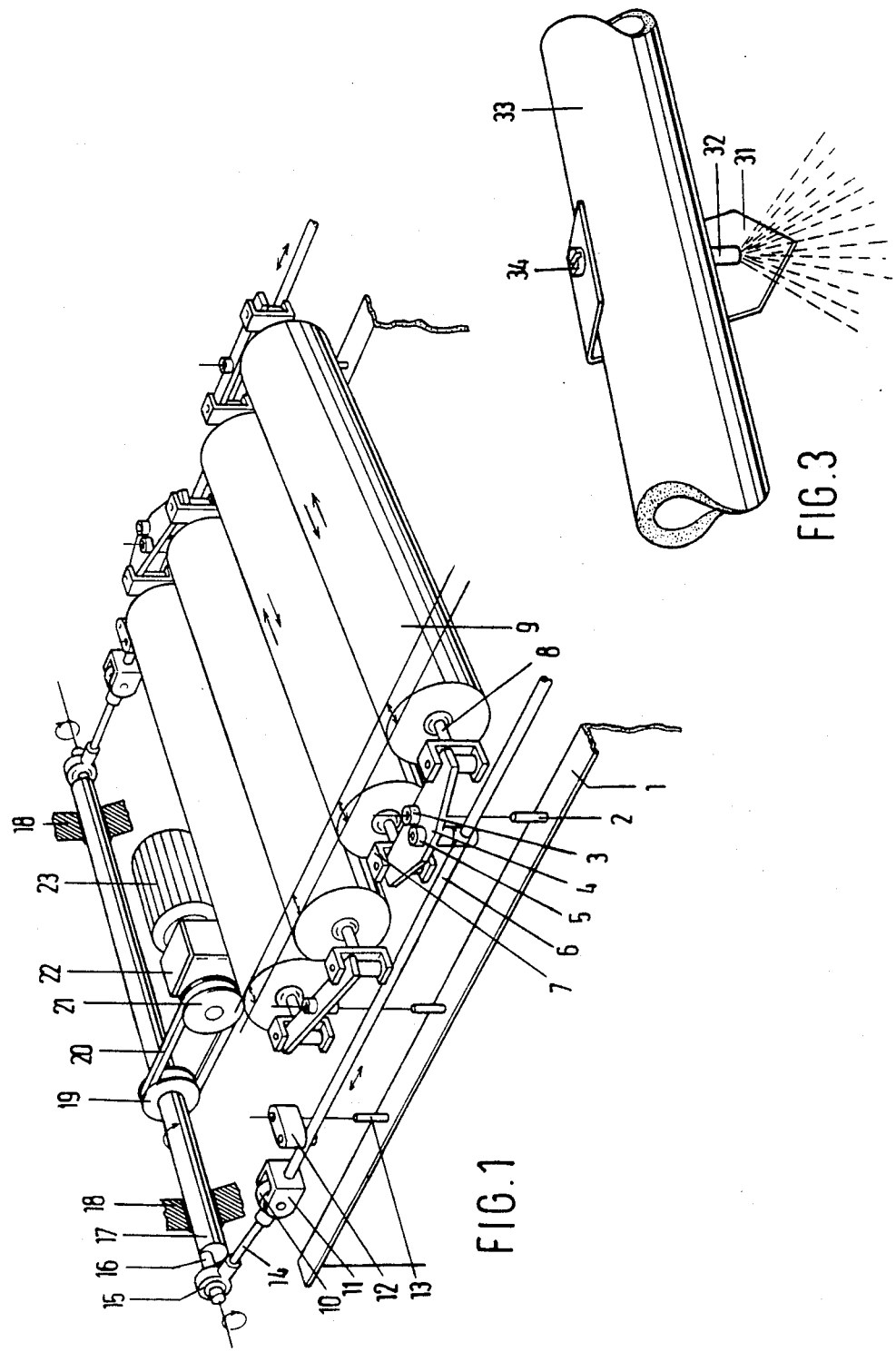

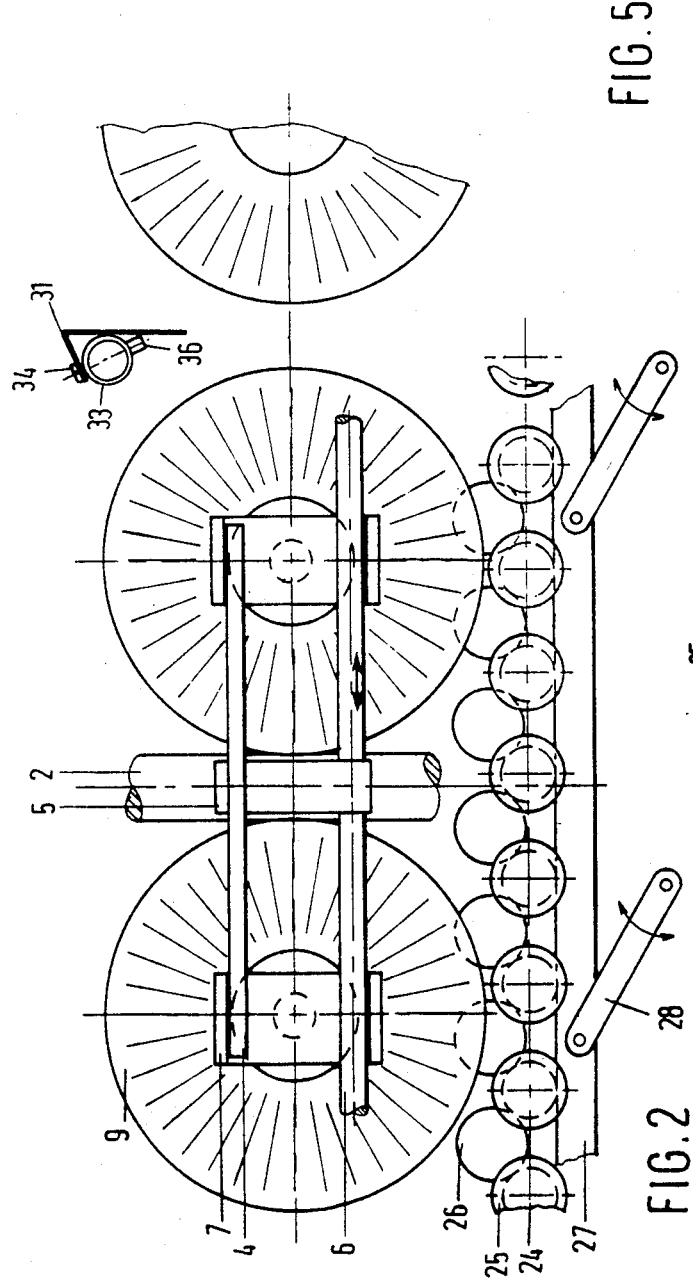
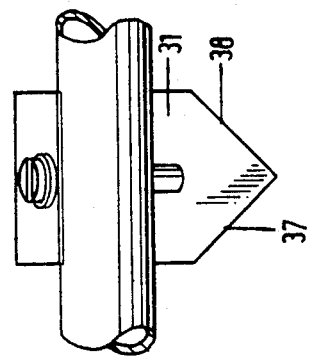
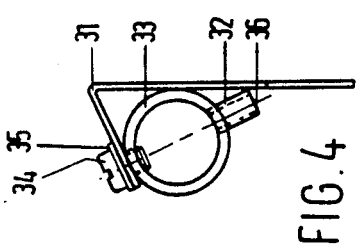
FIG. 5
FIG. 4
FIG. 2

APPARATUS FOR CLEANING EGGS AND LIKE ARTICLES

This invention relates to an apparatus for cleaning eggs.

A prior apparatus of the kind to which this invention relates is disclosed in U.S. Pat. No. 3,392,414. The prior apparatus comprises a housing, a rolling conveyor, at least the upper run of which extends through said housing, rotary brushes disposed above said upper run of the roller conveyor, at least one driving crank shaft for moving the brushes in an axial direction, and fluid supply means disposed above said brushes. In the prior apparatus, the brushes are driven by a single motor via a single chain and sprockets provided on the brush shafts. To move the brushes in an axial direction, the rotary shafts are each provided at one end with a driving crank shaft mechanism, the crank portion of which is mounted on a continuous shaft drivable by said chain.

The prior construction has the disadvantage of being subject to excessive wear and tear, as a result of which it suffers from play between the various parts of the apparatus within a short period of time. Another disadvantage is that the construction comprises a large number of parts, which makes it comparatively expensive. A further disadvantage is that the sprayers are relatively expensive and in addition are apt to become clogged after some time due, for example, to lime deposits or the like. Also, the sprayers spread too much moisture into the ambient atmosphere in the form of a mist.

It is an object of the present invention to remove the above disadvantages.

For this purpose, in the apparatus according to the invention, the brushes are coupled two by two by means of a yoke or crosshead comprising a bearing arranged to rotate around a journal fixedly secured to a frame, each yoke or crosshead further being provided with a pin by means of which the yoke or crosshead is connected to a drive shaft, one end of which is arranged to be driven by means of a driving crank-shaft mechanism or the like.

In this manner, not only is a greatly simplified construction provided, but in addition one in which, owing to the brushes being coupled two by two by means of a yoke or crosshead a balancing of forces is achieved, which results in greatly reduced loads on the bearings and a greatly reduced wear and tear.

In a further elaboration of the invention, a rotation of the brushes can be effected, by making the roller track disposed under the brushes, vertically adjustable. As a result the brushes are driven by the eggs supplied and transported by means of the roller conveyor. As a consequence, the force exerted on the eggs can be adjusted at choice, and at the same time an adjustment can be effected to suit the size of the eggs being cleaned. Naturally, the degree of fouling of the egg shells will also be taken into consideration.

For the sake of completeness, reference is made to U.S. Pat. No. 3,392,414, which discloses an egg washing machine in which the brushes are also driven by the eggs and wherein the roller belt conveyor is vertically adjustable.

In a further elaboration of the present invention, the sprayers comprise a spray nozzle and a spraying plate or baffle spaced behind said nozzle to provide a spreading surface making an acute angle (the so-called spray angle) with the axis of the nozzle. The acute angle is 10° to 80°, preferably about 30°. Furthermore, the "spray pattern" can be influenced by altering the distance of the nozzle from the spraying plate.

The spraying plate preferably has a right-angled end with the lowest point in the vertical plane containing the axis of the nozzle.

The spray pattern can be further influenced by making the spraying plate or baffle of curved rather than flat configuration.

Also, the spray nozzle outlet end may be provided with a nipple.

A very simple and hence inexpensive construction is produced, when, in accordance with the present invention, a through-bore is formed in a water supply duct at the desired spray angle, referred to hereinbefore, while the spraying plate has an extended top portion which is bent, the bent portion being provided with a drilled hole. The baffle can thus be secured to the water supply duct in a simple manner by means of a tap bolt, while if desired the baffle can be welded or solded to the circumference of the supply duct, and this after the provision of a spray nozzle in the pipe hole located diametrically opposite the first hole.

A further advantage of the sprayer according to the invention over and above the prior sprayer is that the dropplets formed are larger and less misting occurs. As a consequence, the surrounding in which the apparatus is arranged will become less moist.

One embodiment of the apparatus for cleaning eggs and a sprayer for use therein will now be described, by way of example, with reference to the accompanying drawings, in which FIG. 1 is a perspective view of part of the apparatus according to the invention, showing two pairs of brushes and the way in which they are mounted;

FIG. 2 is an end view of a detail of FIG. 1 on a larger scale, showing one pair of brushes arranged above a roller conveyor carrying eggs being cleaned;

FIG. 3 is a perspective view of a sprayer mounted on a water supply pipe;

FIG. 4 is a cross-sectional view of the arrangement illustrated in FIG. 3; and

FIG. 5 is a side-elevational view of the showing of FIGS. 3 and 4.

Referring to the drawings, an apparatus for cleaning eggs, in accordance with the present invention, comprises a frame 1, shown in part only, with fixed journals 2. Journals 2 each serve for cooperation with a bearing 3 mounted on a yoke or crosshead 4. Yoke or crosshead 4 further comprises a pin 5 serving for connecting yoke or crosshead 4 with a subjacent driving rod 6.

On opposite sides of bearing 3, the yoke or crosshead is pivotably attached to a fork member 7 secured to a shaft 8 mounting a brush 9 for free rotation. Brushes of this kind may have various& forms, which are well-known to those skilled in the art (see, for example, the above U.S. Pat. No. 3,392,414), and will not be described in any detail herein.

Driving rod 6 is connected adjacent its end, by means of a coupling member 12 to a journal 13 parallel to the fixed journals 2 and also connected to the frame, and the end of shaft 6 is pivoted by means of fork member 11 and bearing 10 to a connecting rod 14, the other end of which is connected through a bearing 15 to a crank 16 secured eccentrically to a second connecting rod 17. The second connecting rod 17 is mounted in bearings 18, shown diagrammatically, fixedly secured to frame 1.

Mounted on the second connecting rod 17 is a pulley 19 which via a belt 20 can cooperate with a pulley 21 secured to an output shaft of a reduction gearbox 22, operatively associated with the output shaft of a driving motor 23. Shaft 17 extends further to the other side of the machine, where it is similarly connected to similar crossheads or yokes. As shown in FIGS. 1 and 2, the brushes are coupled pairwise, and are reciprocated in their longitudinal direction, the yokes being driven alternately from opposite sides of shaft 17.

Means are provided for vertically adjusting a roller conveyor 24 with rollers 25, on which eggs 26 are moved past the rollers. These means essentially consist of a guide rail 27, which by means of several parallel levers 28 can be adjusted upwardly and downwardly.

Referring now to FIGS. 3-5, a sprayer for use in the apparatus according to the invention comprises a spraying plate or baffle 31 and a spray nozzle 32 connected to a water supply pipe 33.

As best shown in FIG. 4, the upper portion of plate 31 is bent and secured by means of tap bolt 34 and a washer 35 to the water supply pipe 33. Diametrically opposite the point of attachment of bolt 34 to the water supply pipe a spray nozzle 32 is mounted therein. The outlet end 36 thereof may have any desired shape to control the spray pattern, or be provided with a nipple, not shown, but known per se, to restrict the passage of the spray nozzle 32.

As shown in FIGS. 3 and 5, the lower end of plate 31 has two baffled edges 37 and 38, which are at right angles to each other. FIG. 4 shows spray nozzle 32 positioned at a preferred angle of about 30° to plate 31.

For clarity only FIG. 2 diagrammatically shows a roller conveyor 24 and eggs 26 thereon. FIG. 3 further shows diagrammatically the spray pattern achieved. Further parts which are unnecessary for a good understanding of the invention have been omitted.

It will be clear that a large number of modifications and variants are possible without departing from the scope of the invention.

What I claim is:

1. An apparatus for cleaning eggs having a housing, a roller conveyor disposed adjacent said housing such that at least an upper portion of said conveyor is disposed within said housing, a plurality of rotatable elongated brushes disposed within said housing and adjacent said upper portion of the conveyor, at least one crankshaft operably connected to said brushes for reciprocating the brushes along the axes thereof, and a wash fluid supply means disposed above the said brushes for supplying wash liquid to said brushes, the improvement comprising at least one yoke having spaced apart connecting means for connecting each of a pair of adjacent brushes to said yoke at the axes of the brushes, a bearing disposed on said yoke between said spaced apart connecting means, a journal with a portion being received by said bearing so that said yoke is rotatable about said journal and another portion being fixedly attached to a support frame member, a pin fixed by a first end thereof to said yoke and being disposed between the spaced apart connecting means, a driving rod disposed adjacent said yoke and being fixed at a first portion to a second end of said pin and operably connected at a second portion to a drivable crank-shaft disposed such that reciprocable motion to said driving rod is provided, whereby said driving rod is reciprocable along its axis, said pin is reciprocable along the axis of the driving rod, the yoke is reciprocable about said journal and said pair of adjacent brushes are oppositely reciprocable along the axes thereof.

2. Apparatus as claimed in claim 1, wherein the roller conveyor portion disposed adjacent the brushes is vertically adjustable.

3. Apparatus as claimed in claim 1 or 2, comprising a spray nozzle and a spraying plate disposed adjacent at least one of said brushes and said spraying plate being spaced behind said nozzle to provide a spreading surface for fluid flowing therethrough, said spraying plate being at an acute angle with the axis of the nozzle.

4. Apparatus as claimed in claim 3, wherein the said angle is 10° to 80°.

5. Apparatus as claimed in claim 3, wherein the spraying plate has a right-angled end with the lowest point in the vertical plane containing the axis of the nozzle.

6. Apparatus as claimed in claim 3, wherein the spraying plate is planar.

7. Apparatus as claimed in claim 3, wherein the spraying plate is curved.

8. Apparatus as claimed in claim 3, wherein the spraying plate has an extended top portion which is bent and said top portion is secured to a fluid supply pipe.

9. Apparatus as claimed in claim 3, wherein an outlet of the spraying nozzle is provided with a nipple.

10. Apparatus as claimed in claim 3, wherein the spraying plate is disposed behind the nozzle at a distance of 1-3 × the diameter of the nozzle.

* * * * *